(12) United States Patent
Jeddeloh

(10) Patent No.: US 7,222,210 B2
(45) Date of Patent: May 22, 2007

(54) SYSTEM AND METHOD FOR MEMORY HUB-BASED EXPANSION BUS

(75) Inventor: Joseph M. Jeddeloh, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 11/399,986

(22) Filed: Apr. 7, 2006

(65) Prior Publication Data

US 2006/0179203 A1    Aug. 10, 2006

Related U.S. Application Data

(62) Division of application No. 10/810,229, filed on Mar. 25, 2004.

(51) Int. Cl.
*G06F 13/00* (2006.01)
*G06F 13/38* (2006.01)
*G06F 12/00* (2006.01)
*G11C 7/00* (2006.01)

(52) U.S. Cl. ............ 710/311; 710/316; 710/300; 709/201; 370/423; 370/912; 711/105

(58) Field of Classification Search ............ 710/100, 710/300, 104, 311, 5, 303, 2, 305, 316; 712/11, 712/15, 34, 220; 365/63, 52, 230.01; 361/679, 361/684; 345/418; 370/351, 338, 423, 912; 711/105, 119, 5, 149; 713/400; 709/201, 709/219
See application file for complete search history.

(56) References Cited

U.S. PATENT DOCUMENTS 4,045,781 A    8/1977    Levy et al. ............ 364/200
4,240,143 A    12/1980   Besemer et al. ........ 364/200
4,245,306 A    1/1981    Besemer et al. ........ 364/200
4,253,144 A    2/1981    Bellamy et al. ........ 364/200
4,253,146 A    2/1981    Bellamy et al. ........ 364/200
4,443,845 A    4/1984    Hamilton et al. ....... 364/200

(Continued)

FOREIGN PATENT DOCUMENTS

EP    0849685 A2    6/1998

(Continued)

OTHER PUBLICATIONS

"USB sensor network for industrial applications" by Depari et al. (abstract only) Publication Date: May 18-20, 2004.*

(Continued)

*Primary Examiner*—Gopal C. Ray
(74) *Attorney, Agent, or Firm*—Dorsey & Whitney LLP

(57) ABSTRACT

A system memory includes a memory hub controller, a memory module accessible by the memory hub controller, and an expansion module having a processor circuit coupled to the memory module and also having access to the memory module. The memory hub controller is coupled to the memory hub through a first portion of a memory bus on which the memory requests from the memory hub controller and memory responses from the memory hub are coupled. A second portion of the memory bus couples the memory hub to the processor circuit and is used to couple memory requests from the processor circuit and memory responses provided by the memory hub to the processor circuit.

19 Claims, 4 Drawing Sheets

U.S. PATENT DOCUMENTS

| | | | | |
|---|---|---|---|---|
| 4,608,702 A | 8/1986 | Hirzel et al. | | 375/110 |
| 4,707,823 A | 11/1987 | Holdren et al. | | 370/1 |
| 4,724,520 A | 2/1988 | Athanas et al. | | 364/200 |
| 4,813,772 A | 3/1989 | Kowel et al. | | 350/388 |
| 4,891,808 A | 1/1990 | Williams | | 370/112 |
| 4,930,128 A | 5/1990 | Suzuki et al. | | 371/12 |
| 4,953,930 A | 9/1990 | Ramsey et al. | | 350/96.11 |
| 5,241,506 A | 8/1993 | Motegi et al. | | 365/210 |
| 5,243,703 A | 9/1993 | Farmwald et al. | | 395/325 |
| 5,251,303 A | 10/1993 | Fogg, Jr. et al. | | 395/275 |
| 5,269,022 A | 12/1993 | Shinjo et al. | | 395/700 |
| 5,307,381 A | 4/1994 | Ahuja | | 375/107 |
| 5,317,752 A | 5/1994 | Jewett et al. | | 395/750 |
| 5,319,755 A | 6/1994 | Farmwald et al. | | 395/325 |
| 5,327,553 A | 7/1994 | Jewett et al. | | 395/575 |
| 5,355,391 A | 10/1994 | Horowitz et al. | | 375/36 |
| 5,379,382 A | 1/1995 | Work et al. | | 395/275 |
| 5,432,823 A | 7/1995 | Gasbarro et al. | | 375/356 |
| 5,432,907 A | 7/1995 | Picazo, Jr. et al. | | 395/200 |
| 5,442,770 A | 8/1995 | Barratt | | 395/403 |
| 5,461,627 A | 10/1995 | Rypinski | | 370/95.2 |
| 5,465,229 A | 11/1995 | Bechtolsheim et al. | | 345/477 |
| 5,479,370 A | 12/1995 | Furuyama et al. | | 365/189.12 |
| 5,497,476 A | 3/1996 | Oldfield et al. | | 395/439 |
| 5,502,621 A | 3/1996 | Schumacher et al. | | 361/760 |
| 5,544,319 A | 8/1996 | Acton et al. | | 395/200.07 |
| 5,566,325 A | 10/1996 | Bruce, II et al. | | 395/494 |
| 5,577,220 A | 11/1996 | Combs et al. | | 395/416 |
| 5,581,767 A | 12/1996 | Katsuki et al. | | 395/800 |
| 5,606,717 A | 2/1997 | Farmwald et al. | | 395/856 |
| 5,608,264 A | 3/1997 | Gaul | | 257/734 |
| 5,623,534 A | 4/1997 | Desai et al. | | 379/59 |
| 5,638,334 A | 6/1997 | Farmwald et al. | | 365/230.03 |
| 5,659,798 A | 8/1997 | Blumrich et al. | | 395/846 |
| 5,706,224 A | 1/1998 | Srinivasan et al. | | 365/49 |
| 5,715,456 A | 2/1998 | Bennett et al. | | 395/652 |
| 5,729,709 A | 3/1998 | Harness | | 395/405 |
| 5,748,616 A | 5/1998 | Riley | | 370/242 |
| 5,787,475 A | 7/1998 | Pawlowski | | 711/137 |
| 5,818,844 A | 10/1998 | Singh et al. | | 370/463 |
| 5,819,304 A | 10/1998 | Nilsen et al. | | 711/5 |
| 5,822,255 A | 10/1998 | Uchida | | 365/194 |
| 5,831,467 A | 11/1998 | Leung et al. | | 327/319 |
| 5,832,250 A | 11/1998 | Whittaker | | 395/471 |
| 5,875,352 A | 2/1999 | Gentry et al. | | 395/843 |
| 5,875,454 A | 2/1999 | Craft et al. | | 711/113 |
| 5,928,343 A | 7/1999 | Farmwald et al. | | 710/104 |
| 5,966,724 A | 10/1999 | Ryan | | 711/105 |
| 5,973,935 A | 10/1999 | Schoenfeld et al. | | 361/813 |
| 5,973,951 A | 10/1999 | Bechtolsheim et al. | | 365/52 |
| 5,978,567 A | 11/1999 | Rebane et al. | | 395/200.49 |
| 5,987,196 A | 11/1999 | Noble | | 385/14 |
| 6,023,726 A | 2/2000 | Saksena | | 709/219 |
| 6,026,226 A | 2/2000 | Heile et al. | | 395/500.13 |
| 6,029,250 A | 2/2000 | Keeth | | 713/400 |
| 6,031,241 A | 2/2000 | Silfvast et al. | | 250/504 R |
| 6,033,951 A | 3/2000 | Chao | | 438/253 |
| 6,061,263 A | 5/2000 | Boaz et al. | | 365/51 |
| 6,061,296 A | 5/2000 | Ternullo, Jr. et al. | | 365/233 |
| 6,067,262 A | 5/2000 | Irrinki et al. | | 365/201 |
| 6,073,190 A | 6/2000 | Rooney | | 710/56 |
| 6,076,139 A | 6/2000 | Welker et al. | | 711/104 |
| 6,078,451 A | 6/2000 | Ioki | | 360/51 |
| 6,079,008 A | 6/2000 | Clery, III | | 712/11 |
| 6,098,158 A | 8/2000 | Lay et al. | | 711/162 |
| 6,101,151 A | 8/2000 | Watanabe et al. | | 365/233 |
| 6,105,075 A | 8/2000 | Ghaffari | | 710/5 |
| 6,111,757 A | 8/2000 | Dell et al. | | 361/737 |
| 6,125,431 A | 9/2000 | Kobayashi | | 711/154 |
| 6,131,149 A | 10/2000 | Lu et al. | | 711/167 |
| 6,134,624 A | 10/2000 | Burns et al. | | 710/131 |
| 6,137,709 A | 10/2000 | Boaz et al. | | 365/51 |
| 6,144,587 A | 11/2000 | Yoshida | | 365/189.05 |
| 6,167,465 A | 12/2000 | Parvin et al. | | 710/22 |
| 6,167,486 A | 12/2000 | Lee et al. | | 711/120 |
| 6,175,571 B1 | 1/2001 | Haddock et al. | | 370/423 |
| 6,185,352 B1 | 2/2001 | Hurley | | 385/114 |
| 6,186,400 B1 | 2/2001 | Dvorkis et al. | | 235/462.45 |
| 6,191,663 B1 | 2/2001 | Hannah | | 333/17.3 |
| 6,201,724 B1 | 3/2001 | Ishizaki et al. | | 365/49 |
| 6,208,180 B1 | 3/2001 | Fisch et al. | | 327/141 |
| 6,219,725 B1 | 4/2001 | Diehl et al. | | 710/26 |
| 6,226,729 B1 | 5/2001 | Stevens et al. | | 711/171 |
| 6,229,727 B1 | 5/2001 | Doyle | | 365/63 |
| 6,233,376 B1 | 5/2001 | Updegrove | | 385/14 |
| 6,243,769 B1 | 6/2001 | Rooney | | 710/56 |
| 6,243,831 B1 | 6/2001 | Mustafa et al. | | 714/24 |
| 6,246,618 B1 | 6/2001 | Yamamoto et al. | | 365/200 |
| 6,247,107 B1 | 6/2001 | Christie | | 711/216 |
| 6,249,802 B1 | 6/2001 | Richardson et al. | | 709/200 |
| 6,256,692 B1 | 7/2001 | Yoda et al. | | 710/104 |
| 6,266,730 B1 | 7/2001 | Perino et al. | | 710/126 |
| 6,272,609 B1 | 8/2001 | Jeddeloh | | 711/169 |
| 6,285,349 B1 | 9/2001 | Smith | | 345/147 |
| 6,286,083 B1 | 9/2001 | Chin et al. | | 711/151 |
| 6,294,937 B1 | 9/2001 | Crafts et al. | | 327/158 |
| 6,301,637 B1 | 10/2001 | Krull et al. | | 711/112 |
| 6,327,642 B1 | 12/2001 | Lee et al. | | 711/120 |
| 6,330,205 B2 | 12/2001 | Shimizu et al. | | 365/230.06 |
| 6,347,055 B1 | 2/2002 | Motomura | | 365/189.05 |
| 6,349,363 B2 | 2/2002 | Cai et al. | | 711/129 |
| 6,356,573 B1 | 3/2002 | Jonsson et al. | | 372/46 |
| 6,367,074 B1 | 4/2002 | Bates et al. | | 717/11 |
| 6,370,068 B2 | 4/2002 | Rhee | | 365/196 |
| 6,373,777 B1 | 4/2002 | Suzuki | | 365/230.03 |
| 6,381,190 B1 | 4/2002 | Shinkai | | 365/230.03 |
| 6,392,653 B1 | 5/2002 | Malandain et al. | | 345/501 |
| 6,401,213 B1 | 6/2002 | Jeddeloh | | 713/401 |
| 6,405,280 B1 | 6/2002 | Ryan | | 711/105 |
| 6,421,744 B1 | 7/2002 | Morrison et al. | | 710/22 |
| 6,434,639 B1 | 8/2002 | Haghighi | | 710/39 |
| 6,434,654 B1 | 8/2002 | Story et al. | | 710/307 |
| 6,434,696 B1 | 8/2002 | Kang | | 713/2 |
| 6,434,736 B1 | 8/2002 | Schaecher et al. | | 716/17 |
| 6,438,622 B1 | 8/2002 | Haghighi et al. | | 710/1 |
| 6,438,668 B1 | 8/2002 | Esfahani et al. | | 711/165 |
| 6,449,308 B1 | 9/2002 | Knight, Jr. et al. | | 375/212 |
| 6,453,393 B1 | 9/2002 | Holman et al. | | 711/154 |
| 6,457,116 B1 | 9/2002 | Mirsky et al. | | 712/16 |
| 6,462,978 B2 | 10/2002 | Shibata et al. | | 365/63 |
| 6,463,059 B1 | 10/2002 | Movshovich et al. | | 370/389 |
| 6,470,422 B2 | 10/2002 | Cai et al. | | 711/129 |
| 6,473,828 B1 | 10/2002 | Matsui | | 711/104 |
| 6,477,592 B1 | 11/2002 | Chen et al. | | 710/52 |
| 6,477,614 B1 | 11/2002 | Leddige et al. | | 711/5 |
| 6,477,621 B1 | 11/2002 | Lee et al. | | 711/120 |
| 6,479,322 B2 | 11/2002 | Kawata et al. | | 438/109 |
| 6,490,188 B2 | 12/2002 | Nuxoll et al. | | 365/63 |
| 6,493,803 B1 | 12/2002 | Pham et al. | | 711/147 |
| 6,496,909 B1 | 12/2002 | Schimmel | | 711/163 |
| 6,501,471 B1 | 12/2002 | Venkataraman et al. | | 345/424 |
| 6,502,161 B1 | 12/2002 | Perego et al. | | 711/5 |
| 6,505,287 B2 | 1/2003 | Uematsu | | 711/170 |
| 6,523,092 B1 | 2/2003 | Fanning | | 711/134 |
| 6,523,093 B1 | 2/2003 | Bogin et al. | | 711/137 |
| 6,526,498 B1 | 2/2003 | Mirsky et al. | | 712/11 |
| 6,539,490 B1 | 3/2003 | Forbes et al. | | 713/401 |
| 6,552,564 B1 | 4/2003 | Forbes et al. | | 326/30 |
| 6,553,479 B2 | 4/2003 | Mirsky et al. | | 712/16 |
| 6,564,329 B1 | 5/2003 | Cheung et al. | | 713/322 |
| 6,570,429 B1 | 5/2003 | Hellriegel | | 327/295 |
| 6,584,543 B2 | 6/2003 | Williams et al. | | 711/105 |
| 6,587,912 B2 | 7/2003 | Leddige et al. | | 711/5 |
| 6,590,816 B2 | 7/2003 | Perner | | 365/200 |

| | | |
|---|---|---|
| 6,594,713 B1 | 7/2003 | Fuoco et al. ............... 710/31 |
| 6,594,722 B1 | 7/2003 | Willke, II et al. .......... 710/313 |
| 6,598,154 B1 | 7/2003 | Vaid et al. ................ 712/237 |
| 6,615,325 B2 | 9/2003 | Mailloux et al. ........... 711/154 |
| 6,622,227 B2 | 9/2003 | Zumkehr et al. ........... 711/167 |
| 6,628,294 B1 | 9/2003 | Sadowsky et al. .......... 345/568 |
| 6,629,220 B1 | 9/2003 | Dyer ....................... 711/158 |
| 6,631,440 B2 | 10/2003 | Jenne et al. ............... 711/105 |
| 6,636,110 B1 | 10/2003 | Ooishi et al. ............... 327/565 |
| 6,636,957 B2 | 10/2003 | Stevens et al. ............. 711/171 |
| 6,646,929 B1 | 11/2003 | Moss et al. ................ 365/194 |
| 6,651,139 B1 | 11/2003 | Ozeki et al. ............... 711/118 |
| 6,658,509 B1 | 12/2003 | Bonella et al. ............. 710/100 |
| 6,662,304 B2 | 12/2003 | Keeth et al. ............... 713/400 |
| 6,665,202 B2 | 12/2003 | Lindahl et al. ............. 365/49 |
| 6,667,895 B2 | 12/2003 | Jang et al. ................. 365/63 |
| 6,681,292 B2 | 1/2004 | Creta et al. ................ 711/119 |
| 6,697,926 B2 | 2/2004 | Johnson et al. ............ 711/167 |
| 6,715,018 B2 | 3/2004 | Farnworth et al. ......... 710/300 |
| 6,718,440 B2 | 4/2004 | Maiyuran et al. ........... 711/137 |
| 6,721,187 B2 | 4/2004 | Hall et al. .................. 361/760 |
| 6,721,195 B2 | 4/2004 | Brunelle et al. ............. 365/63 |
| 6,724,685 B2 | 4/2004 | Braun et al. ............... 365/233 |
| 6,728,800 B1 | 4/2004 | Lee et al. .................. 710/54 |
| 6,735,679 B1 | 5/2004 | Herbst et al. .............. 711/167 |
| 6,735,682 B2 | 5/2004 | Segelken et al. ........... 711/220 |
| 6,745,275 B2 | 6/2004 | Chang ....................... 710/305 |
| 6,751,113 B2 | 6/2004 | Bhakta et al. .............. 365/63 |
| 6,751,703 B2 | 6/2004 | Chilton ...................... 711/113 |
| 6,751,722 B2 | 6/2004 | Mirsky et al. .............. 712/15 |
| 6,754,117 B2 | 6/2004 | Jeddeloh .................... 365/201 |
| 6,754,812 B1 | 6/2004 | Abdallah et al. ........... 712/234 |
| 6,756,661 B2 | 6/2004 | Tsuneda et al. ............. 257/673 |
| 6,760,833 B1 | 7/2004 | Dowling .................... 712/34 |
| 6,771,538 B2 | 8/2004 | Shukuri et al. ........ 365/185.05 |
| 6,772,261 B1 | 8/2004 | D'Antonio et al. ......... 710/301 |
| 6,775,747 B2 | 8/2004 | Venkatraman ............. 711/137 |
| 6,789,173 B1 | 9/2004 | Tanaka et al. .............. 711/147 |
| 6,792,059 B2 | 9/2004 | Yuan et al. ................. 375/354 |
| 6,792,496 B2 | 9/2004 | Aboulenein et al. ....... 710/306 |
| 6,793,408 B2 | 9/2004 | Levy et al. ................. 385/88 |
| 6,795,899 B2 | 9/2004 | Dodd et al. ................ 711/137 |
| 6,799,246 B1 | 9/2004 | Wise et al. ................. 711/117 |
| 6,799,268 B1 | 9/2004 | Boggs et al. ............... 712/228 |
| 6,804,760 B2 | 10/2004 | Wiliams .................... 711/170 |
| 6,804,764 B2 | 10/2004 | LaBerge et al. ............ 711/170 |
| 6,807,630 B2 | 10/2004 | Lay et al. .................. 713/2 |
| 6,811,320 B1 | 11/2004 | Abbott ....................... 385/58 |
| 6,816,931 B2 | 11/2004 | Shih ......................... 710/62 |
| 6,816,947 B1 | 11/2004 | Huffman .................... 711/151 |
| 6,820,181 B2 | 11/2004 | Jeddeloh et al. ........... 711/169 |
| 6,821,029 B1 | 11/2004 | Grung et al. ............... 385/92 |
| 6,823,023 B1 | 11/2004 | Hannah ..................... 375/296 |
| 6,845,409 B1 | 1/2005 | Talagala et al. ............. 710/20 |
| 6,889,304 B2 | 5/2005 | Perego et al. .............. 711/170 |
| 6,910,109 B2 | 6/2005 | Holman et al. ............. 711/156 |
| 6,950,956 B2 | 9/2005 | Zerbe et al. ............... 713/400 |
| 6,956,996 B2 | 10/2005 | Gordon et al. ............. 385/48 |
| 7,000,062 B2 | 2/2006 | Perego et al. ............... 711/5 |
| 7,016,213 B2 | 3/2006 | Reeves et al. .............. 365/63 |
| 7,016,606 B2 | 3/2006 | Cai et al. ................... 398/27 |
| 7,024,547 B2 | 4/2006 | Kartoz ....................... 713/1 |
| 7,035,212 B1* | 4/2006 | Mittal et al. ............... 370/230 |
| 7,047,351 B2* | 5/2006 | Jeddeloh .................... 711/5 |
| 7,062,595 B2 | 6/2006 | Lindsay et al. ............. 710/315 |
| 2001/0023474 A1 | 9/2001 | Kyozuka et al. ........... 711/114 |
| 2001/0034839 A1 | 10/2001 | Karjoth et al. ............. 713/190 |
| 2001/0039612 A1 | 11/2001 | Lee .......................... 713/2 |
| 2002/0038412 A1* | 3/2002 | Nizar et al. ................ 711/170 |
| 2002/0083287 A1* | 6/2002 | Zumkehr et al. ........... 711/167 |
| 2002/0112119 A1 | 8/2002 | Halbert et al. ............. 711/115 |
| 2002/0116588 A1 | 8/2002 | Beckert et al. ............. 711/161 |
| 2002/0144064 A1 | 10/2002 | Fanning ..................... 711/144 |
| 2003/0005223 A1 | 1/2003 | Coulson et al. ............. 711/118 |
| 2003/0043158 A1 | 3/2003 | Wasserman et al. ....... 345/545 |
| 2003/0043426 A1 | 3/2003 | Baker et al. ............... 359/109 |
| 2003/0093630 A1 | 5/2003 | Richard et al. ............. 711/154 |
| 2003/0110368 A1 | 6/2003 | Kartoz ....................... 713/1 |
| 2003/0149809 A1 | 8/2003 | Jensen et al. ............... 710/22 |
| 2003/0163649 A1 | 8/2003 | Kapur et al. ............... 711/146 |
| 2003/0177320 A1 | 9/2003 | Sah et al. .................. 711/158 |
| 2003/0193927 A1 | 10/2003 | Hronik ...................... 370/351 |
| 2003/0217223 A1 | 11/2003 | Nino, Jr. et al. ........... 711/105 |
| 2003/0227798 A1 | 12/2003 | Pax ......................... 365/189.12 |
| 2003/0229734 A1 | 12/2003 | Chang et al. ............... 710/36 |
| 2003/0229770 A1 | 12/2003 | Jeddeloh .................... 711/213 |
| 2004/0015650 A1* | 1/2004 | Zumkehr et al. ........... 711/105 |
| 2004/0022094 A1 | 2/2004 | Radhakrishnan et al. ... 365/200 |
| 2004/0024959 A1 | 2/2004 | Taylor ....................... 711/105 |
| 2004/0028412 A1 | 2/2004 | Murphy ..................... 398/135 |
| 2004/0044833 A1 | 3/2004 | Ryan ......................... 711/5 |
| 2004/0047169 A1 | 3/2004 | Lee et al. ................... 365/63 |
| 2004/0123088 A1 | 6/2004 | Poisner et al. .............. 713/1 |
| 2004/0126115 A1 | 7/2004 | Levy et al. ................. 398/116 |
| 2004/0128421 A1 | 7/2004 | Forbes ....................... 710/303 |
| 2004/0144994 A1 | 7/2004 | Lee et al. ................... 257/200 |
| 2004/0148482 A1 | 7/2004 | Grundy et al. ............. 711/167 |
| 2004/0230718 A1 | 11/2004 | Polzin et al. ............... 710/22 |
| 2004/0236885 A1 | 11/2004 | Fredriksson et al. ....... 710/100 |
| 2004/0251929 A1 | 12/2004 | Pax et al. ................... 326/30 |
| 2004/0257890 A1 | 12/2004 | Lee et al. ................... 365/200 |
| 2005/0044304 A1* | 2/2005 | James ........................ 711/105 |
| 2005/0044327 A1 | 2/2005 | Howard et al. ............. 711/147 |
| 2005/0071542 A1 | 3/2005 | Weber et al. ............... 711/105 |
| 2005/0091464 A1 | 4/2005 | James ........................ 711/167 |
| 2005/0162882 A1 | 7/2005 | Reeves et al. .............. 365/63 |
| 2005/0177690 A1 | 8/2005 | LaBerge .................... 711/154 |
| 2005/0210216 A1 | 9/2005 | Jobs et al. .................. 711/170 |
| 2005/0228939 A1 | 10/2005 | Janzen ...................... 711/105 |
| 2005/0257021 A1 | 11/2005 | James ........................ 711/170 |
| 2005/0268060 A1* | 12/2005 | Cronin et al. .............. 711/167 |

FOREIGN PATENT DOCUMENTS

| | | |
|---|---|---|
| JP | 2001265539 A | 9/2001 |
| WO | WO 93/19422 | 9/1993 |
| WO | WO 02/27499 A2 | 4/2002 |

OTHER PUBLICATIONS

Gillett, R. et al., "*Using The Memory Channel Network*", Micro IEEE, vol. 17, Issue 1, Jan.-Feb. 1997, Abstract Only, Two pages.

"Free On-Line Dictionary of Computing" entry Flash Erasable Programmable Read-Only Memory, online May 17, 2004 [http://foldoc.doc.ic.ac.uk/foldoc/foldoc.cgi?flash+memory].

Intel, "Flash Memory PCI Add-In Card for Embedded Systems", Application Note AP-758, Sep. 1997, pp. i-13.

Intel, "Intel 840 Chipset: 82840 Memory Controller Hub (MCH)", Datasheet, www.intel.com/design/chipsets/datashts/298020.htm, Oct. 1999, pp. 1-178.

Micron Technology, Inc., "Synchronous DRAM Module 512MB/1GB (x72, ECC) 168-PIN Registered FBGA SDRAM DIMM", Micron Technology, Inc., 2002, pp. 1-23.

Shanley, T. et al., "PCI System Architecture", Third Edition, Mindshare, Inc., 1995, pp. 24-25.

Hsieh, M. et al., "On The Design of A Local Switch For Heterogenous Multi-Subsystem Interconnect", TENCON '93, Proceedings, Computer, Communications, Control and Power Engineering, 1993, IEEE Region 10 Conference, vol. 3, Oct. 1993. Abstract Only. One page.

Gommans, L. et al., "Applications drive secure lightpath creation across heterogeneous domains", Communications Magazine, IEEE, vol. 44, Issue 3, Mar. 2006. Abstract only.

* cited by examiner

SYSTEM AND METHOD FOR MEMORY HUB-BASED EXPANSION BUS

CROSS-REFERENCE TO RELATED APPLICATION

This application is a divisional of pending U.S. patent application Ser. No. 10/810,229, filed Mar. 25, 2004.

TECHNICAL FIELD

The present invention relates generally to a memory system for a processor-based computing system, and more particularly, to a hub-based memory system providing expansion capabilities for computer components.

BACKGROUND OF THE INVENTION

Computer systems use memory devices, such as dynamic random access memory ("DRAM") devices, to store data that are accessed by a processor. These memory devices are normally used as system memory in a computer system. In a typical computer system, the processor communicates with the system memory through a processor bus and a memory controller. The memory devices of the system memory, typically arranged in memory modules having multiple memory devices, are coupled through a memory bus to the memory controller. The processor issues a memory request, which includes a memory command, such as a read command, and an address designating the location from which data or instructions are to be read. The memory controller uses the command and address to generate appropriate command signals as well as row and column addresses, which are applied to the system memory through the memory bus. In response to the commands and addresses, data are transferred between the system memory and the processor. The memory controller is often part of a system controller, which also includes bus bridge circuitry for coupling the processor bus to an expansion bus, such as a PCI bus.

In memory systems, high data bandwidth is desirable. Generally, bandwidth limitations are not related to the memory controllers since the memory controllers sequence data to and from the system memory as fast as the memory devices allow. One approach that has been taken to increase bandwidth is to increase the speed of the memory data bus coupling the memory controller to the memory devices. Thus, the same amount of information can be moved over the memory data bus in less time. However, despite increasing memory data bus speeds, a corresponding increase in bandwidth does not result. One reason for the non-linear relationship between data bus speed and bandwidth is the hardware limitations within the memory devices themselves. That is, the memory controller has to schedule all memory commands to the memory devices such that the hardware limitations are honored. Although these hardware limitations can be reduced to some degree through the design of the memory device, a compromise must be made because reducing the hardware limitations typically adds cost, power, and/or size to the memory devices, all of which are undesirable alternatives. Thus, given these constraints, although it is easy for memory devices to move "well-behaved" traffic at ever increasing rates, for example, sequel traffic to the same page of a memory device, it is much more difficult for the memory devices to resolve "badly-behaved traffic," such as bouncing between different pages or banks of the memory device. As a result, the increase in memory data bus bandwidth does not yield a corresponding increase in information bandwidth.

In addition to the limited bandwidth between processors and memory devices, the performance of computer systems is also limited by latency problems that increase the time required to read data from system memory devices. More specifically, when a memory device read command is coupled to a system memory device, such as a synchronous DRAM ("SDRAM") device, the read data are output from the SDRAM device only after a delay of several clock periods. Therefore, although SDRAM devices can synchronously output burst data at a high data rate, the delay in initially providing the data can significantly slow the operating speed of a computer system using such SDRAM devices. Increasing the memory data bus speed can be used to help alleviate the latency issue. However, as with bandwidth, the increase in memory data bus speeds do not yield a linear reduction of latency, for essentially the same reasons previously discussed.

Although increasing memory data bus speed has, to some degree, been successful in increasing bandwidth and reducing latency, other issues are raised by this approach. For example, as the speed of the memory data bus increases, loading on the memory bus needs to be decreased in order to maintain signal integrity since traditionally, there has only been wire between the memory controller and the memory slots into which the memory modules are plugged. Several approaches have been taken to address the memory bus loading issue. For example, reducing the number of memory slots to limit the number of memory modules that contribute to the loading of the memory bus, adding buffer circuits on a memory module in order to provide sufficient fanout of control signals to the memory devices on the memory module, and providing multiple memory device interfaces on the memory module since there are too few memory module connectors on a single memory device interface. The effectiveness of these conventional approaches are, however, limited. A reason why these techniques were used in the past is that it was cost-effective to do so. However, when only one memory module can be plugged in per interface, it becomes too costly to add a separate memory interface for each memory slot. In other words, it pushes the system controllers package out of the commodity range and into the boutique range, thereby, greatly adding cost.

One recent approach that allows for increased memory data bus speed in a cost effective manner is the use of multiple memory devices coupled to the processor through a memory hub. A computer system 100 shown in FIG. 1 uses a memory hub architecture. The computer system 100 includes a processor 104 for performing various computing functions, such as executing specific software to perform specific calculations or tasks. The processor 104 includes a processor bus 106 that normally includes an address bus, a control bus, and a data bus. The processor bus 106 is typically coupled to cache memory 108, which, is typically static random access memory ("SRAM"). Finally, the processor bus 106 is coupled to a system controller 110, which is also sometimes referred to as a bus bridge. The system controller 110 serves as a communications path to the processor 104 for a variety of other components. For example, as shown in FIG. 1, the system controller 110 includes a graphics port that is typically coupled to a graphics controller 112, which is, in turn, coupled to a video terminal 114. The system controller 110 is also coupled to one or more input devices 118, such as a keyboard or a mouse, to allow an operator to interface with the computer system 100. Typically, the computer system 100 also includes one or more output devices 120, such as a printer, coupled to the processor 104 through the system controller 110. One or more data storage devices 124 are also typically coupled to the processor 104 through the system controller 110 to allow the processor 104 to store data or retrieve data from internal or external storage media (not shown). Examples of typical storage devices 124 include hard and floppy disks, tape cassettes, and compact disk read-only memories (CD-ROMs).

The system controller 110 includes a memory hub controller 128 that is coupled to the processor 104. The system controller 110 is further coupled over a high speed bi-directional or unidirectional system controller/hub interface 134 to several memory modules 130*a–n*. As shown in FIG. 1, the controller/hub interface 134 includes a downstream bus 154 and an upstream bus 156 which are used to couple data, address, and/or control signals away from or toward, respectively, the memory hub controller 128. Typically, the memory modules 130*a–n* are coupled in a point-to-point or daisy chain architecture such that the memory modules 130*a–n* are connected one to another in series. Thus, the system controller 110 is coupled to a first memory module 130*a*, with the first memory module 130*a* connected to a second memory module 130*b*, and the second memory module 130*b* coupled to a third memory module 130*c*, and so on in a daisy chain fashion. Each memory module 130*a–n* includes a memory hub 140 that is coupled to the system controller/hub interface 134, and is further coupled a number of memory devices 148 through command, address and data buses, collectively shown as local memory bus 150. The memory hub 140 efficiently routes memory requests and responses between the memory hub controller 128 and the memory devices 148.

The memory devices 148 on the memory modules 130*a–n* are typically capable of operating at high clock frequencies in order to facilitate the relatively high speed operation of the overall memory system. Consequently, computer systems employing this architecture can also use the high-speed system controller/hub interface 134 to complement the high clock speeds of the memory devices 148. Additionally, with a memory hub based system, signal integrity can be maintained on the system controller/hub interface 134 since the signals are typically transmitted through multiple memory hubs 140 to and from the memory hub controller 128. Moreover, this architecture also provides for easy expansion of the system memory without concern for degradation in signal quality as more memory modules are added, such as occurs in conventional memory bus architectures.

Although the memory hub architecture shown in FIG. 1 provides improved memory system performance, the advantages my not directly benefit the various components of the computer system 100. As previously described, the components, such as the graphics controller 112, the input and output devices 118, 120, and the data storage 124 are coupled to the system controller 110. It is through the system controller 110 that the components 112, 118, 120, 124 access the memory modules 130*a–n*. As a result of the memory requests necessarily being coupled through the system controller 110, a "bottleneck" can often result since the system controller 110 can handle only a finite number of memory requests, and corresponding memory responses from the memory modules 130*a–n*, at a given time. The graphics port through which the graphics controller 112 is coupled to the system controller 110 provides some relief to the bottleneck issue, since the graphics port typically provides direct memory access (DMA) to the memory modules 130*a–n*, as well known in the art. That is, the graphics controller 112 is able to access the memory modules 130*a–n* directly, with limited intervention by the system controller 110.

As well known, arbitration schemes are implemented by the system controller 110 in order to prioritize memory requests it receives from the various components 112, 118, 120, 124, as well as memory requests received from the processor 104. The arbitration schemes that are implemented attempt to provide efficient memory access to the various components 112, 118, 120, 124, and processor 104 in order to maximize processing capabilities. Some memory requests are given priority over others regardless of the order in which the requests are received by the system controller 110, for example, the processor 104 is often given highest priority to access the memory modules 130*a–n* to avoid the situation where processing is halted while the processor 104 is waiting for a memory request to be serviced. As sophisticated as arbitration techniques have become, it is still unlikely that bottlenecks at the system controller 110 can be completely avoided. Even where a component is given direct memory access to the memory modules 130*a–n*, such as the graphics controller 112, it is nevertheless subject to the arbitration routine that is implemented by the system controller 110, and consequently, the component does not have unlimited access privileges to the memory modules 130*a–n*. It is by the nature of the architecture used in the computer system 100, namely, providing access to the memory modules 130*a–n* through the single point of the system controller 110, that makes bottlenecks at the system controller 110 inevitable. Therefore, there is a need for an alternative system and method for providing components of a processing system, such as a computer system, access to memory resources.

SUMMARY OF THE INVENTION

A system memory in one aspect of the invention includes a memory hub controller, a memory module accessible by the memory hub controller, and an expansion module coupled to the memory module having a processor circuit also having access to the memory module. The memory hub controller provides memory requests to access memory devices, and the memory module includes a plurality of memory devices coupled to a memory hub. The memory hub receives the memory requests, accesses the memory devices according to the memory requests, and provides memory responses in response to the memory requests. The processor circuit of the expansion module provides memory requests to the memory hub of the memory module to access the memory devices, and processes data returned in the memory responses from the memory hub. The memory hub controller is coupled to the memory hub through a first portion of a memory bus on which the memory requests and the memory responses are coupled. A second portion of the memory bus couples the memory hub to the processor circuit and is used to couple memory requests from the processor circuit and memory responses provided by the memory hub to the processor circuit.

DETAILED DESCRIPTION OF PREFERRED EMBODIMENTS

Figure 1:
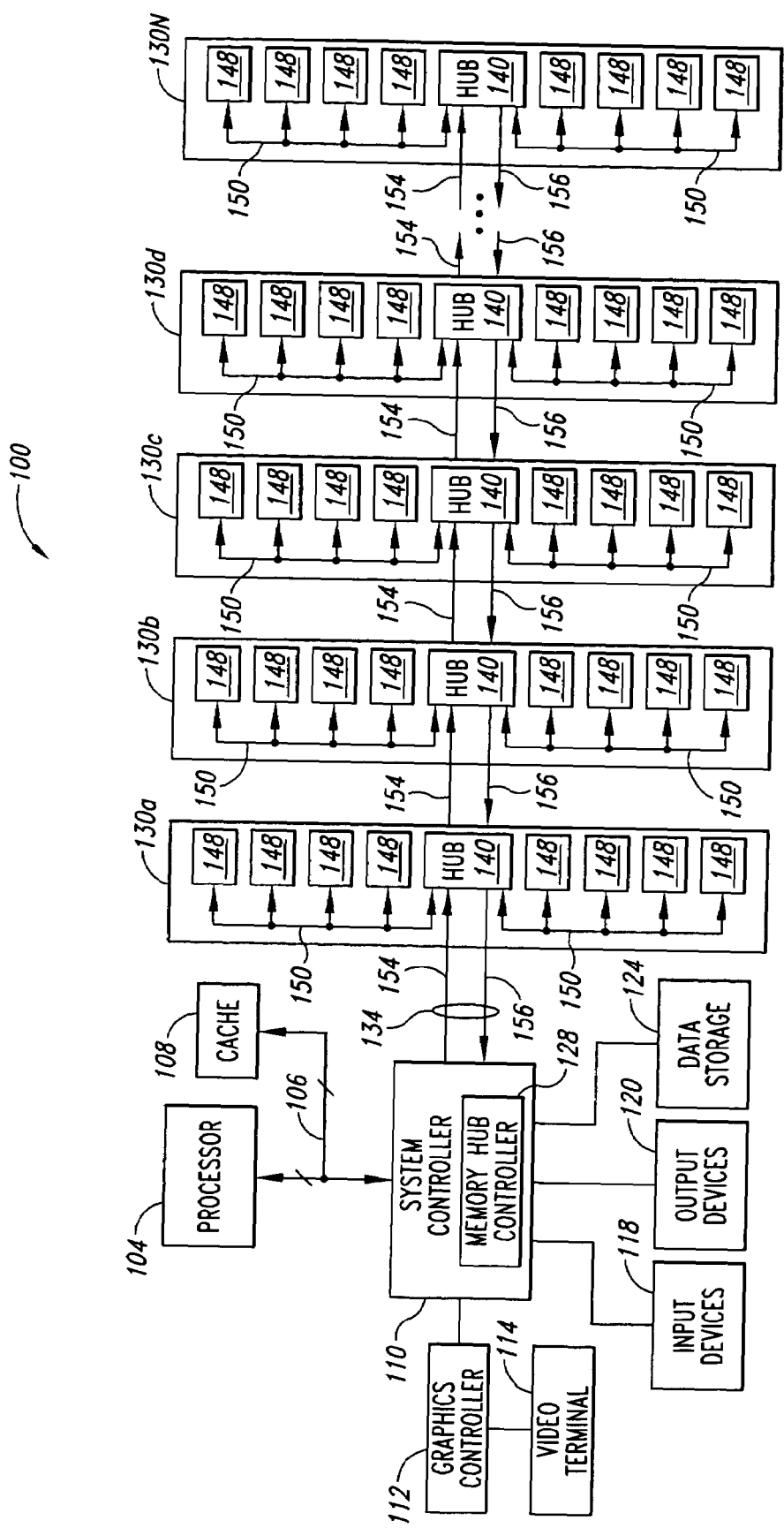
FIG. 1 is a partial block diagram of a conventional processor-based computing system having a memory hub-based system memory.
Figure 2:
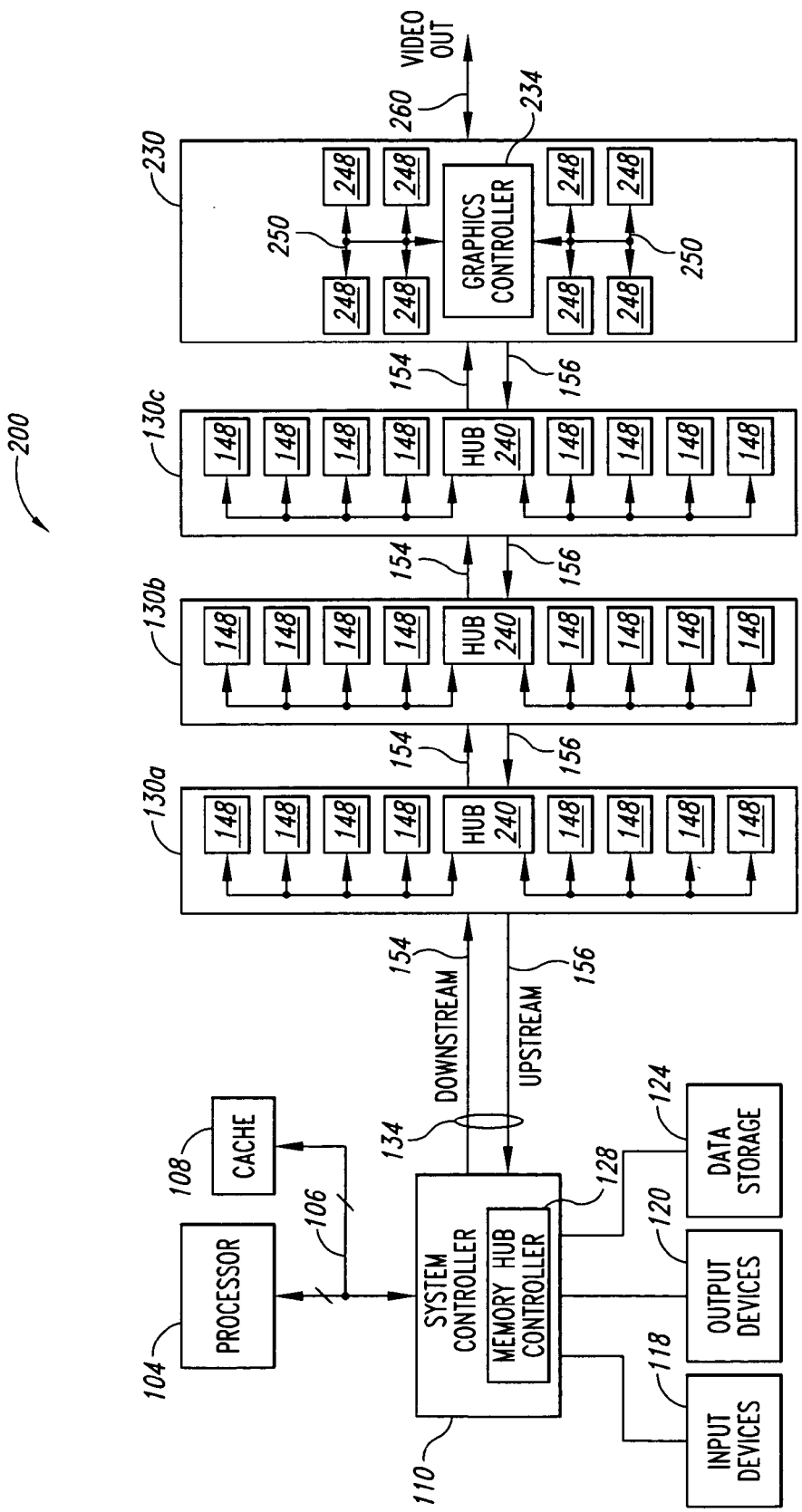
FIG. 2 is a partial block diagram of a processor-based computing system having a memory hub-based memory system according to an embodiment of the present invention providing peripheral component expansion capabilities.

FIG. 2 illustrates a processor based computing system 200 according to an embodiment of the present invention. The system 200 includes many of the same functional blocks as previously described with reference to FIG. 1. As such, the same reference numbers will be used in FIG. 2 as in FIG. 1 to refer to the same functional blocks where appropriate. The system 200 includes a processor 104 coupled to a system controller 110 through a processor bus 106. As in FIG. 1, the processor performs various computing functions, for example, executing software to perform specific calculations or tasks, and the processor bus 106 typically includes an address bus, a control bus, and a data bus. A cache memory 108 is also coupled to the processor bus 106 to provide the processor 104 with temporary storage of frequently used data and instructions. As previously discussed with respect to FIG. 1, the system controller 110 serves as a communications path to the processor 104 for a variety of other components. Typically, this includes one or more input devices 118, such as a keyboard or a mouse, to allow an operator to interface with the system 200, one or more output devices 120, such as a printer, and one or more data storage devices 124 to allow the processor 104 to store data or retrieve data from internal or external storage media (not shown).

As shown in FIG. 2, the system controller 110 includes a memory hub controller 128 to which several memory modules 130a–c are coupled over a high speed bi-directional or unidirectional system controller/hub interface 134. The controller/hub interface 134 includes a downstream bus 154 and an upstream bus 156 which are used to couple data, address, and/or control signals away from or toward, respectively, the memory hub controller 128. As shown in FIG. 2, the memory modules 130a–c are coupled in a point-to-point architecture such that the memory modules 130a–c are connected one to another in series. Each memory module 130a–c in the system 200 includes a memory hub 240 that is coupled to the system controller/hub interface 134, and is further coupled a number of memory devices 148 through command, address and data buses, collectively shown as bus 150. As previously mentioned, the memory hub 240 efficiently routes and arbitrates memory requests and responses between the memory hub controller 128 and the memory devices 148. As will be explained in further detail below, the memory hub 240 can receive memory requests and provide memory responses in both downstream and upstream directions over the downstream and upstream buses 154, 156, respectively.

In contrast to the computer system 100 of FIG. 1, the system 200 includes a component expansion module 230 coupled to the controller/hub interface 134. As shown in FIG. 2, the component expansion module 230 includes a graphics controller 234 coupled to local memory devices 248 over a local graphics/memory bus 250. The graphics controller 234, the local graphics/memory bus 250, and the local memory devices 248 can be of conventional design and operation, as well known in the art. The graphics/memory bus 250 includes command, data, and address buses as well known in the art. A video bus 260 can be used for coupling video data from the graphics controller 234 to a video terminal (not shown) as known in the art. It will be appreciated that the component expansion module 230 replaces the graphics controller 112 of the computer system 100. That is, the component expansion module 230 can provide the computer graphics capabilities and functionality of the graphics controller 112.

Although the component expansion module 230 is shown in FIG. 2 as having local memory devices 248, access to data stored in the system memory, such as memory modules 130a–c, is often required for processing by the graphics controller 234. For example, the memory provided by the local memory devices 248 may not be sufficient to store all of the graphics data necessary for rendering a scene. As a result, the bulk of the graphics data is typically loaded into system memory, with the graphics controller 234 retrieving the portion of graphics data necessary for rendering the current scene from the system memory. Additionally, since access to the local memory devices 248 is typically limited to the graphics controller 234, data that has been first processed elsewhere, for example, by the processor 104, must be stored to a location in the system memory for retrieval by the graphics controller 234 before being stored in the local memory devices 248 for further processing. Thus, access to the memory modules 130a–c by the component expansion module 230 is often necessary.

The arrangement of the system 200 allows for access to the memory modules 130a–c by the component expansion module 230 without intervention by the system controller 110. As previously discussed, the memory hubs 240 can receive memory requests and provide memory responses in both the downstream and upstream directions. By adopting a consistent communication protocol with the memory hubs 240 of the memory modules 130a–c, communication with the memory hubs 240 of the memory modules 130a–c can be performed directly by the component expansion module 230, thereby eliminating the need for intervention by the system controller 110. As a result, access to the memory modules 130a–c is not limited to going through the system controller 110, but the component expansion module 230 can access the memory modules 130a–c directly. In contrast, the graphics controller 112 in the computer system 100 (FIG. 1) is typically coupled to the system controller 110 through an advanced graphics port, and although the graphics controller 112 has DMA access to the memory, it is still nevertheless subject to the memory request and memory response loading issues of the system controller 110. In the system 200, however, the graphics controller 234 is not subject to the loading issues of the system controller 110.

Many suitable communication protocols are known in the art, including the use of command packets that include appropriate information for making memory requests to particular memory modules 130a–c in the system 200 and providing memory responses in return. For example, command packets can include information such as identification data for uniquely identifying the particular memory request, address information for identifying a particular memory module 130a–c to which the memory request is directed, and memory device command information, including memory addresses, command type, and where a write operation is requested, data can be included as well. Other protocols can be used as well, and it will be appreciated by those ordinarily skilled in the art that the present invention is not limited by the particular protocol implemented.

Additionally, the arrangement of the system 200 reduces the memory request and response load on the system controller 110 since it is relieved from handling the memory requests from a requesting entity, namely the graphics controller 112 (FIG. 1). For these reasons, the likelihood that a memory request and response bottleneck occurring at the system controller 110 is also reduced. Moreover, by coupling the component expansion module 230 to the controller/hub interface 134 rather than to the system controller 110, the number of buses in the system 200 can be reduced.

Figure 3:
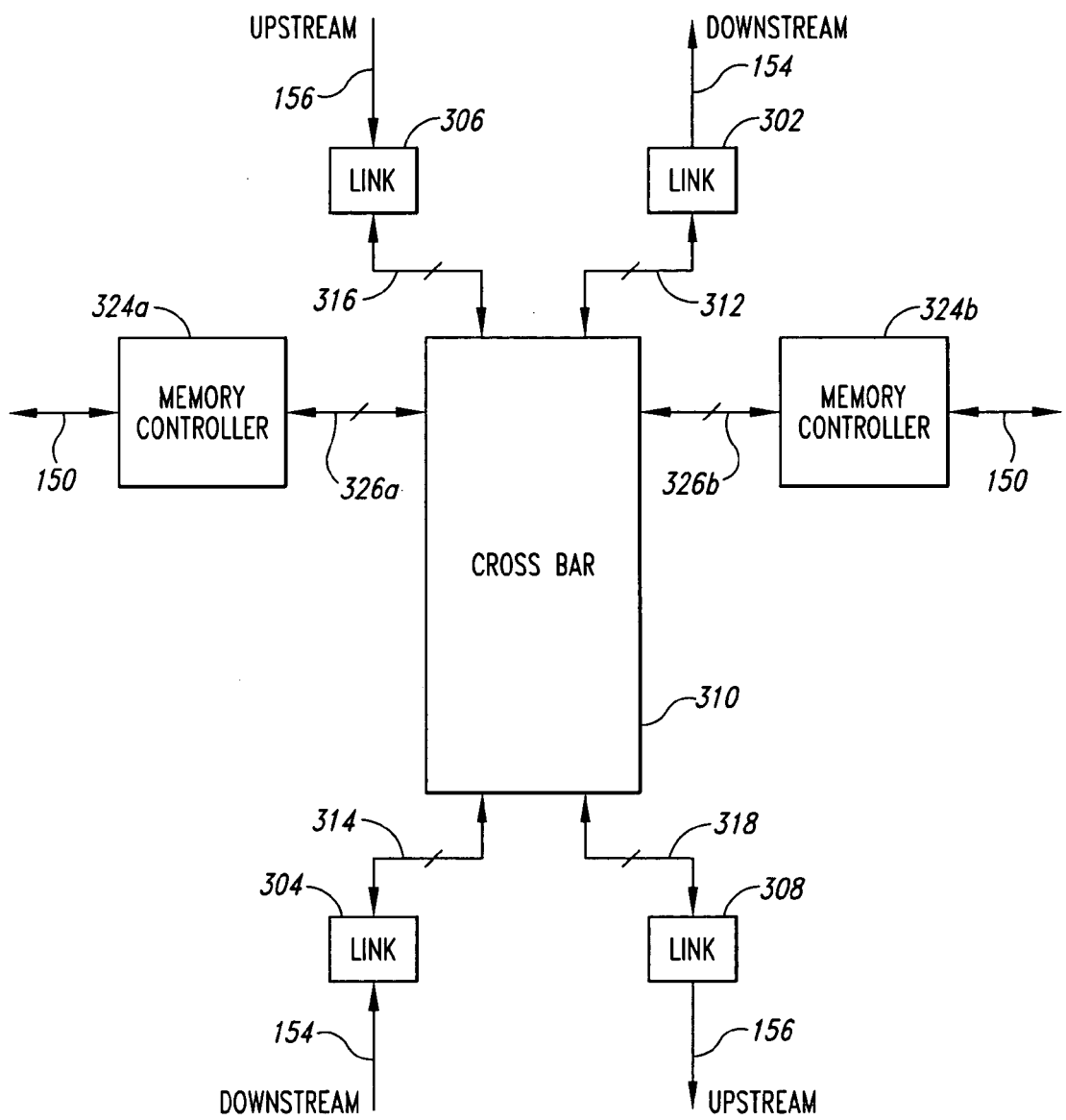
FIG. 3 is a partial block diagram of a memory hub of the hub-based memory system of FIG. 2.

FIG. 3 illustrates a portion of the memory hub 240 (FIG. 2). The memory hub 240 includes four link interfaces 302, 304, 306, 308 coupled to a cross bar switch 310 by respective local link buses 312, 314, 316, 318. Memory controllers 324a, 324b are further coupled to the cross bar switch 310 through respective local memory controller buses 326a, 326b. The cross bar switch 310, which may be of a conventional or hereinafter developed design, can couple any of the link interfaces 302, 304, 306, 308 to each other. The link interfaces 302, 304, 306, 308 may be either unidirectional or duplex interfaces, and the nature of the memory accesses coupled to or from the link interfaces 302, 304, 306, 308 may vary as desired, including communication protocols having conventional memory address, control and data signals, shared address and control signals and packetized memory access signals. As shown in FIG. 3, the link interfaces 302 and 304 are coupled to the downstream bus 154 and the link interfaces 306 and 308 are coupled to the upstream bus 156.

The cross bar switch 310 can also couple any of the link interfaces 302, 304, 306, 308 to either or both of the memory controllers 324a, 324b, each of which is coupled to a plurality of memory devices 148 (not shown in FIG. 3) over respective local memory buses 150 (FIG. 2). The memory controllers 324a, 324b may be conventional memory controllers or some hereinafter developed design for a memory controller. The specific structure and operation of the memory controllers 324a, 324b will, of course, depend on the nature of the memory devices 148 used in the memory modules 130a–c. The cross bar switch 310 couples the link interfaces 302, 304, 306, 308 to the memory controllers 324a, 324b to allow any of a plurality of memory access devices to write data to or read data from the memory devices 148 coupled to the memory controllers 324a, 324b. The cross bar switch 310 further couples the link interfaces 302, 304, 306, 308 to the memory controllers 324a, 324b to allow any data to be transferred to or from the memory devices 148 coupled to the memory controllers 324a–324b from or to, respectively, other memory modules 130a–c containing a memory hub 240. Thus, as previously discussed, the memory hub 240 is capable of receiving memory requests and providing memory responses in both downstream and upstream directions over the downstream and upstream buses 154, 156.

It will be appreciated by those ordinarily skilled in the art that FIG. 3 illustrates merely a portion of the memory hub 240, and that the memory hub 240 will generally include components in addition to those shown in FIG. 3. For example, a cache memory for each of the memory controllers 324a, 324b can be included for storing recently or frequently accessed data retrieved from or stored in the memory devices 148. Additionally, a write buffer can also be included for accumulating write addresses and data directed to the memory devices 148 serviced by a respective one of the memory controllers 324a, 324b if the memory devices 148 are busy servicing a read memory request or other read requests are pending. Such components are conventional and known in the art. These components have been omitted from FIG. 3 in the interest of brevity and clarity. It will further be appreciated by those ordinarily skilled in the art that in some applications, components shown in FIG. 3 may be omitted. For example, although the memory hub 240 shown in FIG. 3 includes two memory controllers 324a, 324b the number of memory controllers may vary as desired.

Figure 4:
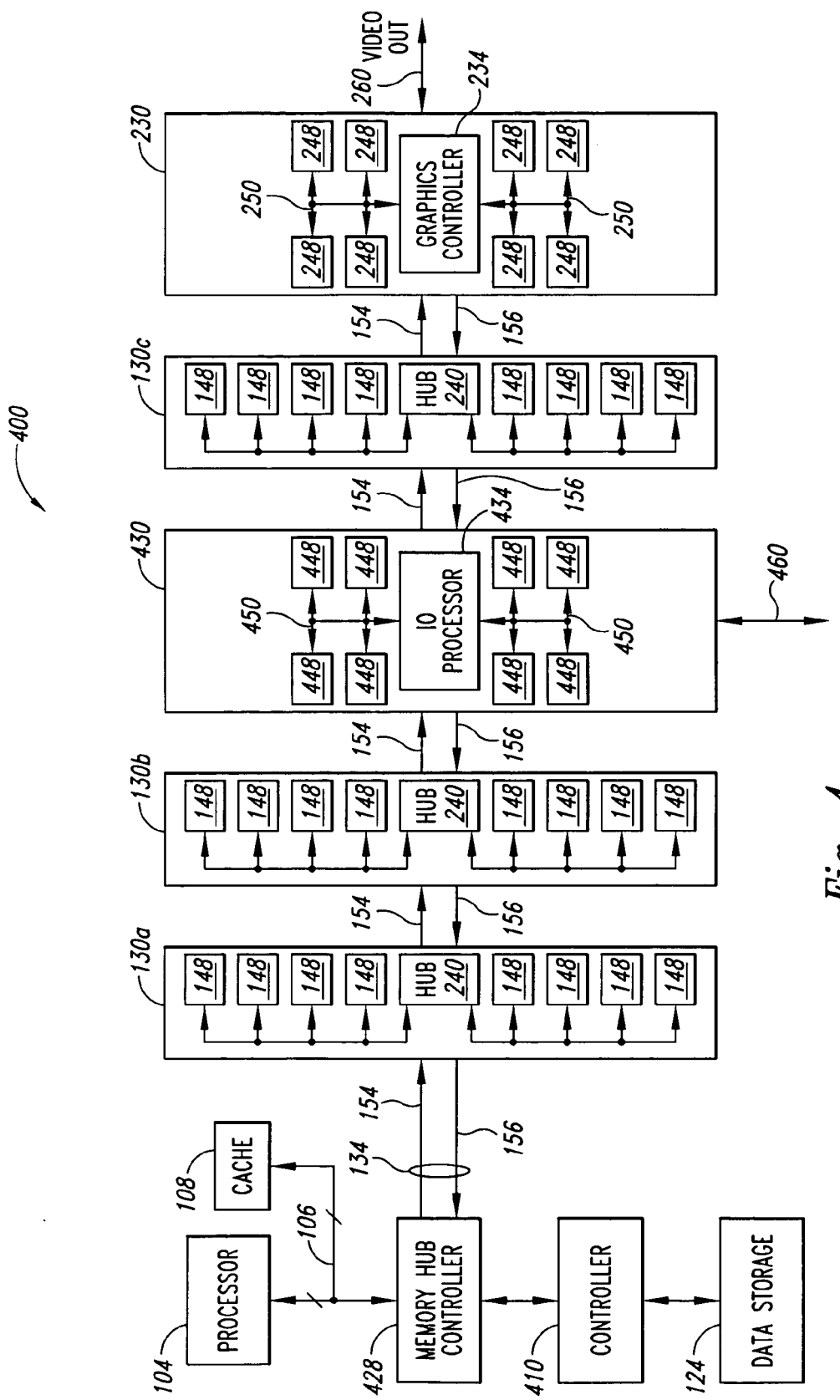
FIG. 4 is a partial block diagram of a processor-based computing system having a memory hub-based memory system according to an alternative embodiment of the present invention providing peripheral component expansion capabilities.

FIG. 4 illustrates a processor-based computing system 400 according to another embodiment of the present invention. The system 400 includes many of the same functional blocks as previously described with reference to FIGS. 1 and 2. As such, the same reference numbers will be used in FIG. 4 as in FIGS. 1 and 2 to refer to the same functional blocks where appropriate. The system 400 includes a processor 104 coupled to a memory hub controller 428 through a processor bus 106. A cache memory 108 is also coupled to the processor bus 106 to provide the processor 104 with temporary storage of frequently used data and instructions. The memory hub controller 428 is further coupled to a system controller 110, which serves as a communications path to the processor 104 for a variety of other components. As shown in FIG. 4, data storage device 124 is coupled to the system controller 110 to allow the processor 104 to store data or retrieve data from internal or external storage media (not shown).

The memory hub controller 428 is coupled over a high speed bidirectional or unidirectional system controller/hub interface 134 to several memory modules 130a–c. The controller/hub interface 134 includes a downstream bus 154 and an upstream bus 156 which are used to couple data, address, and/or control signals away from or toward, respectively, the memory hub controller 428. Each memory module 130a–c in the system 400 includes a memory hub 240 that is coupled to the system controller/hub interface 134, and which is further coupled a number of memory devices 148 through command, address and data buses, collectively shown as bus 150. The memory hub 240 efficiently routes memory requests and responses between the memory hub controller 128 and the memory devices 148. As with the memory hub 240 shown in FIG. 2, memory requests and memory responses can be provided in both downstream and upstream directions over the downstream and upstream buses 154, 156, respectively, by the memory hub 240.

Coupled in series with the memory modules 130a–c over the downstream and upstream buses 154, 156 are component expansion modules 230 and 430. The component expansion module 230, as previously described with reference to FIG. 2, includes a graphics controller 234 coupled to local memory devices 248 over a local graphics/memory bus 250. The component expansion module 230 provides video data over a video bus 260 to a video terminal (not shown), as known in the art. In contrast to the system 200 of FIG. 2, the system 400 further includes the component expansion module 430. The component expansion module 430 includes an input/output (IO) processor 434 coupled to local memory devices 448 over a local memory device bus 450. Although the component expansion module 430 includes local memory devices 448, the IO processor 434 has access to system memory, for example, memory modules 130a–c, as well.

Unlike the systems 100 and 200, where the input and output devices 118, 120 are coupled to the system controller 110, input and output devices (not shown in FIG. 4) can be coupled to the system 400 through the component expansion module 430 and a high-speed IO bus 460. By including the component expansion module 430, memory request and response loading on the system controller 410 can be reduced compared to the configuration of systems 100 and 200. Using a consistent communication protocol with the memory hub 240 over the downstream and upstream buses 154, 156, the memory hub controller 428, the IO processor 434, and the graphics controller 234, can each access the memory modules 130a–c independently. As shown in FIG. 4, the memory modules 130a–c and the component expansion modules 230, 430 are series coupled in an arrangement that takes advantage of the point-to-point architecture provided by the downstream and upstream buses 154, 156. The memory hub controller 428, the IO processor 434 and the graphics controller 234 each have a respective memory module 130a–c which can be used primarily for servicing memory requests by the respective component. That is, the memory module 130a can be used primarily by the memory hub controller 428 for servicing memory requests from the processor 104 and the system controller 410, the memory module 130b can be used primarily by the component expansion module 430 for servicing memory requests from the IO processor 434, and the memory module 130c can be used primarily by the component expansion module 230 for servicing memory requests from the graphics controller 234. Thus, although the memory hub controller 428, the component expansion module 430, and the component expansion module 230 have access to any of the memory modules 130a–c, memory requests from each of the requesting entities can be primarily serviced by a respective memory module 130a–c. As a result, the memory request and response loading that is conventionally handled by the system controller 110 is distributed throughout the memory system, thereby reducing the likelihood of memory requests and response being bottlenecked through one access point.

It will be appreciated by those ordinarily skilled in the art that the embodiments shown in FIGS. 2 and 4 have been provided by way of example, and are not intended to limit the scope of the present invention. Modifications can be made to the previously described embodiments without departing from the scope of the present invention. For example, the system 400 has been described as providing each of the requesting components, the memory hub controller 428, the component expansion module 430, and the component expansion module 230, with a respective memory module 130a–c for primarily servicing memory requests. However, only portions of the memory available on a memory module 130a–c can be used for one requesting entity, with the remaining memory of the same memory module 130a–c allocated for primarily servicing the memory requests of another requesting entity. That is, the allocation of memory is not limited to a per module basis, but can be allocated as desired. Additionally, the order in which the memory modules 130a–c and the requesting entities are coupled, namely the memory hub controller 428, the component expansion module 430, and the component expansion module 230, can be changed and remain within the scope of the present invention. Although the order of the requesting entities can be arranged advantageously with respect to the memory modules 130a–c, as previously described with respect to having a primary memory for servicing memory requests, the present invention is not limited to any specific order of coupling of the memory modules and requesting entities.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A processor-based system, comprising:
   a processor having a processor bus;
   a system controller coupled to the processor bus, the system controller having a peripheral device port, the system controller further comprising a memory hub controller coupled to a system memory port and adapted to provide memory command packets including information to access memory devices;
   a memory module having a plurality of memory devices coupled to a memory hub, the memory hub adapted to receive memory command packets and access the memory devices according to the memory command packets and further adapted to provide memory responses in response thereto;
   a first portion of a memory bus coupled to the system memory port and the memory hub on which the memory command packets from the memory hub controller are provided to the memory hub of the memory module and memory responses are provided to the memory hub controller;
   an expansion module having a processor circuit adapted to provide memory command packets including information to access the memory devices of the memory module and further adapted to process data included in the memory responses from the memory hub; and
   a second portion of the memory bus coupled to the memory hub of the memory module and the processor circuit of the expansion module on which the memory command packets from the processor circuit are provided to the memory hub of the memory module and memory responses are provided to the processor circuit.

2. The processor-based system of claim 1, further comprising at least one peripheral device coupled to the peripheral device port of the system controller.

3. The processor-based system of claim 1 wherein the first and second portions of the memory bus comprise:
   a downstream bus having a first portion coupled between the memory hub controller and the memory hub to which memory command packets from the memory hub controller to the memory hub are coupled and further having a second portion coupled between the memory hub and the processor circuit to which memory responses from the memory hub to the processor circuit are coupled; and
   an upstream bus having a first portion coupled between the memory hub controller and the memory hub to which memory responses from the memory hub to the memory hub controller are coupled and further having a second portion coupled between the memory hub and the processor circuit to which memory command packets from the processor circuit to the memory hub are coupled.

4. The processor-based system of claim 1 wherein the expansion module further comprises:
   a plurality of memory devices adapted to provide a local memory space; and
   a local memory bus coupled to the processor circuit and the plurality of memory devices through which the processor circuit accesses the local memory space.

5. The processor-based system of claim 1 wherein the processor circuit of the expansion module comprises a graphics controller to process graphics data stored in the memory devices of the memory module.

6. The processor-based system of claim 1 wherein the processor circuit of the expansion module comprises an input/output processor to process input data and store the same in the memory devices of the memory module and to process output data stored in the memory devices of the memory module.

7. The processor-based system of claim 1 wherein the memory hub of the memory module comprises:
   a switch circuit having a plurality of switch nodes and adapted to couple any one switch node to another switch node;
   a plurality of link interface circuits, each link interface circuit having a first node coupled to a respective one of the plurality of switch nodes and further having a second node coupled to either the first or second portions of the memory bus, each link interface circuit coupling signals from its first node to its second node;
   a memory controller coupled to a switch node of the switch circuit to receive memory command packets and translate the same into memory device command signals; and
   a local memory bus coupled to the memory controller and the memory devices on which the memory device command signals are provided.

8. The processor-based system of claim 7 wherein the plurality of link interface circuits comprise:
   a first pair of link interface circuits having a downstream link interface coupled to a first portion of a downstream bus and further having an upstream link interface coupled to a first portion of an upstream bus, both the first portions of the downstream and upstream buses coupled to the memory hub controller and the memory hub; and
   a second pair of link interface circuits having a downstream link interface coupled to a second portion of the downstream bus and further having an upstream link interface coupled to a second portion of the upstream bus, both the second portions of the downstream and upstream buses coupled to the memory hub and the processor circuit.

9. The processor-based system of claim 1 wherein the memory devices of the memory module comprise synchronous dynamic random access memory devices.

10. A processor-based system, comprising:
    a processor having a processor bus;
    a system controller coupled to the processor bus, the system controller having a peripheral device port, the system controller further comprising a memory hub controller coupled to a system memory port and adapted to provide memory command packets including information to access memory devices;
    first and second memory modules, each memory module having a respective plurality of memory devices and a respective memory hub coupled to the respective plurality of memory devices, the respective memory hubs adapted to receive memory requests for accessing memory locations in the respective plurality of memory devices and provide memory responses in response to receiving the memory requests;
    first and second expansion modules, each expansion module having a respective processor circuit adapted to provide memory requests to the memory hubs to access memory locations in the respective plurality of memory devices and receive memory responses from the memory hubs;
    a memory hub controller adapted to provide memory requests to the memory modules to the memory hubs to access memory locations in the respective plurality of memory devices and receive memory responses from the memory hubs; and
    a memory bus coupled to the first and second memory hubs, the first and second processor circuits and the system memory port, the memory bus configured to couple memory requests to the memory modules and couple memory responses to the memory hub controller and the first and second processor circuits.

11. The processor-based system of claim 10, further comprising at least one peripheral device coupled to the peripheral device port of the system controller.

12. The processor-based system of claim 10, further comprising a third memory module having a third plurality of memory devices and a third memory hub coupled to the third plurality of memory devices and further coupled to the memory bus in a point-to-point arrangement, the point-to-point arrangement coupling the memory hub controller to the first memory hub of the first memory module, coupling the first memory hub to the second memory hub of the second memory module, coupling the second memory hub to the first processor circuit of the first expansion module, coupling the first processor circuit to the third memory hub of the third memory module; and coupling the third memory hub to the second processor circuit of the second expansion module.

13. The processor-based system of claim 10 wherein the memory bus comprises a pair of unidirectional buses having portions coupled between the first and second memory hubs, the first and second processor circuits and the memory hub controller to provide the point-to-point arrangement.

14. The processor-based system of claim 10 wherein at least one of the first and second expansion modules further comprises:
    a plurality of memory devices adapted to provide a local memory space; and
    a local memory bus coupled to the respective processor circuit and the respective plurality of memory devices through which the processor circuit accesses the local memory space.

15. The processor-based system of claim 10 wherein the processor circuit of at least one of the first and second expansion modules comprises a graphics controller to process graphics data stored in the memory devices of at least one of the memory modules.

16. The processor-based system of claim 10 wherein the processor circuit of at least one of the first and second expansion modules comprises an input/output processor to process input data and store the same in the memory devices of at least one of the memory modules and to process output data stored in the memory devices of the memory module.

17. The processor-based system of claim 10 wherein the memory hub of at least one of the memory modules comprises:
    a switch circuit having a plurality of switch nodes and adapted to couple any one switch node to another switch node;
    a plurality of link interface circuits, each link interface circuit having a first node coupled to a respective one of the plurality of switch nodes and further having a second node coupled to the memory bus, each link interface circuit coupling signals from its first node to its second node;
    a memory controller coupled to a switch node of the switch circuit to receive memory requests and translate the same into memory device command signals; and a local memory bus coupled to the memory controller and the memory devices on which the memory device command signals are provided.

18. The processor-based system of claim 17 wherein the memory bus comprises a unidirectional downstream bus and a unidirectional upstream bus, and the plurality of link interface circuits comprise:
   a first pair of link interface circuits having a downstream link interface coupled to a first portion of the downstream bus and further having an upstream link interface coupled to a first portion of the upstream bus; and
   a second pair of link interface circuits having a downstream link interface coupled to a second portion of the downstream bus and further having an upstream link interface coupled to a second portion of the upstream bus.

19. The processor-based system of claim 10 wherein the memory devices of the memory module comprise synchronous dynamic random access memory devices.

* * * * *